Figure 1:
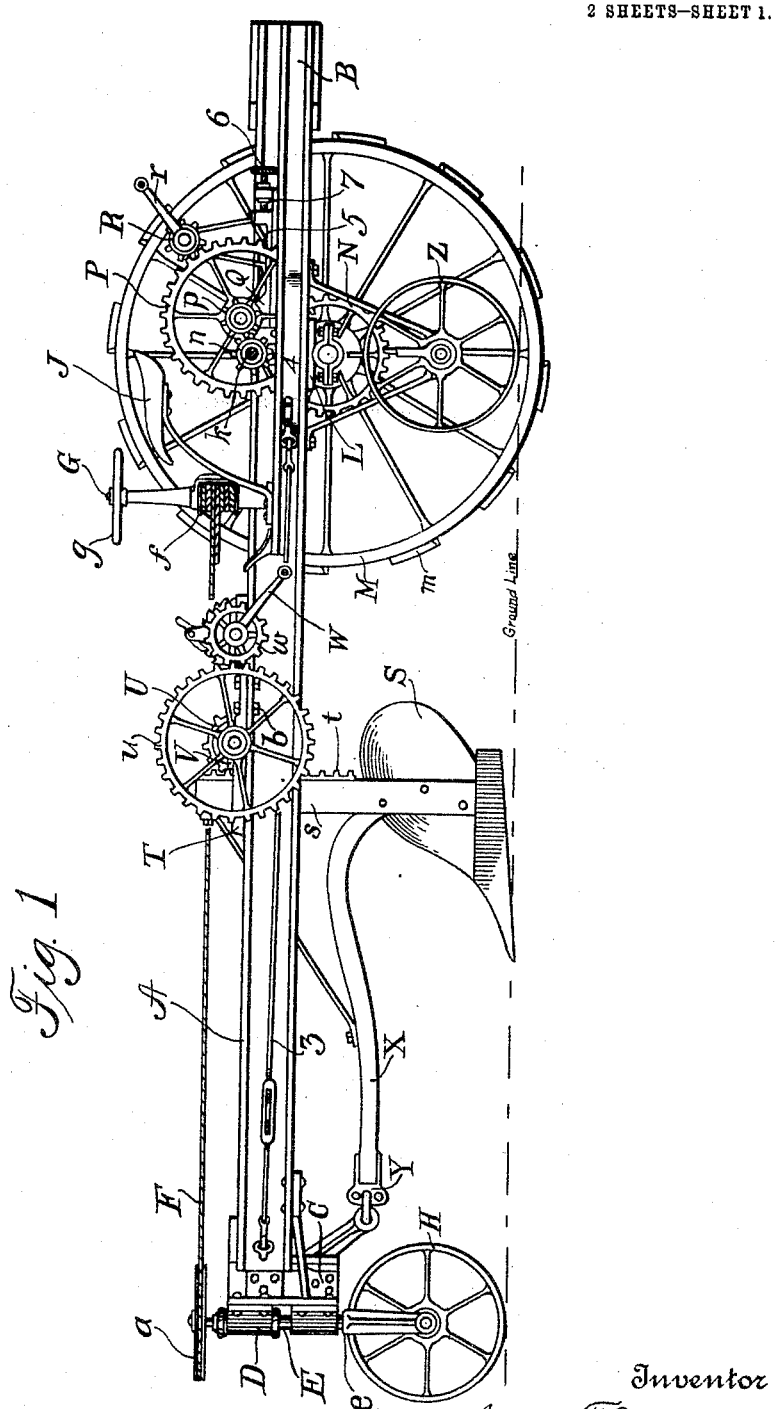

N. F. CHAMBERLIN.
MOTOR PLOW.
APPLICATION FILED OCT. 11, 1912.

1,071,205.

Patented Aug. 26, 1913.
2 SHEETS—SHEET 1.

Witnesses
G. Terry
Edwin Guthrie

Inventor
Newton F. Chamberlin
By Jos. A. Burkart,
Attorney

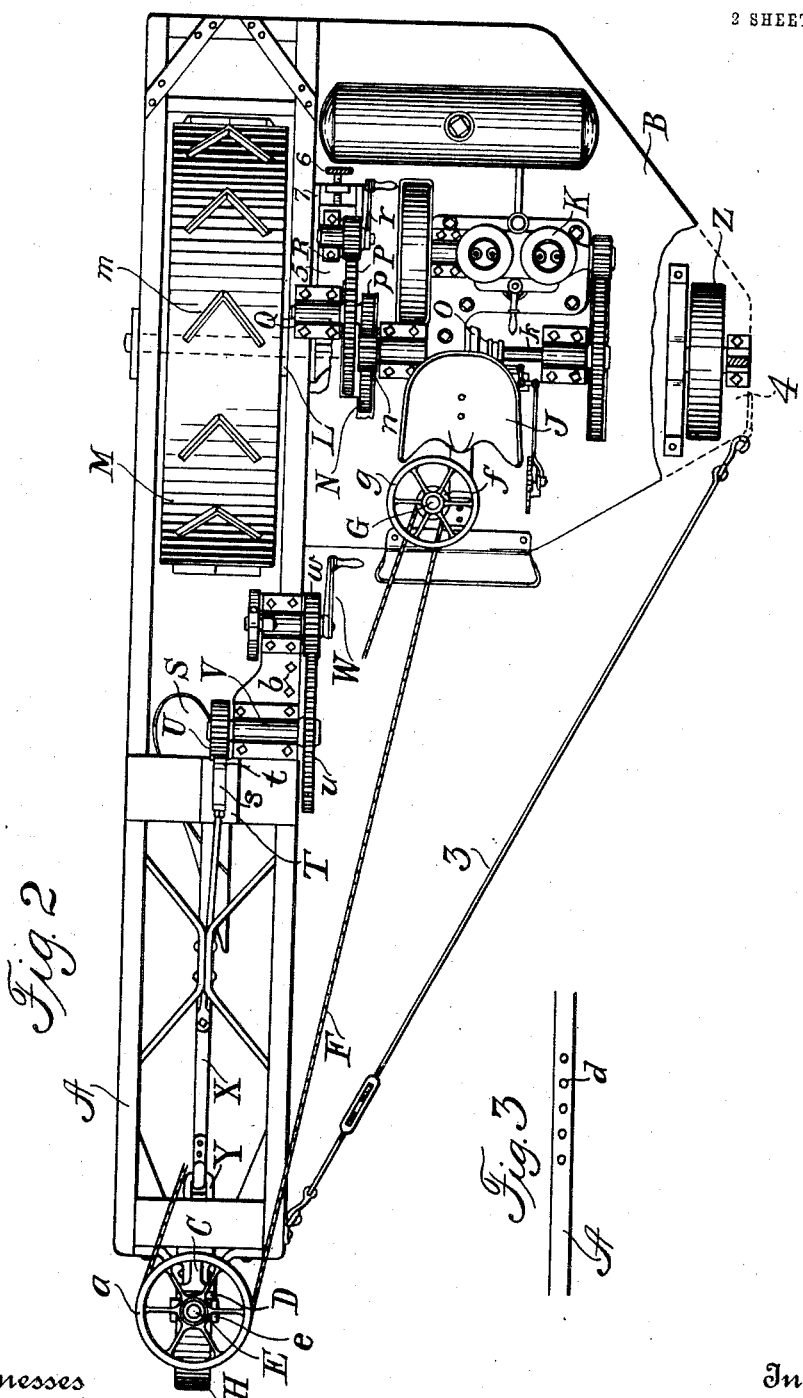

UNITED STATES PATENT OFFICE.

NEWTON F. CHAMBERLIN, OF LIBERTYVILLE, ILLINOIS, ASSIGNOR OF ONE-HALF TO FOREST E. MARSH, OF PRAIRIE VIEW, ILLINOIS.

MOTOR-PLOW.

1,071,205.  Specification of Letters Patent.  Patented Aug. 26, 1913.

Application filed October 11, 1912. Serial No. 725,284.

*To all whom it may concern:*

Be it known that I, NEWTON F. CHAMBERLIN, a citizen of the United States, residing at Libertyville, in the county of Lake and State of Illinois, have invented certain new and useful Improvements in Motor-Plows, of which the following is a specification.

This invention relates to motor plows, and has for its object the production of a wheeled supporting carriage, triangular in arrangement, provided with a relatively large driving wheel having a peripheral construction adapted to follow the furrow and move a plow located before it. The guiding wheel on the carriage, and the side supporting wheel being so disposed as to always roll upon unplowed ground with consequently even progress.

The object of this invention also comprises devices to be constructed and arranged for raising and lowering the plow, and means for securing the said devices upon the frame of the machine at different points toward or from the main driving or traction wheel.

In the accompanying drawings, Figure 1 represents a side view of several parts assembled, and Fig. 2 is a plan view complete, taken from above. Fig. 3 shows a portion of the main frame and certain bolt holes therein.

Throughout the drawings and specification the same letter is used to refer to the same part.

The main frame A, suitably braced and strengthened, is provided at its rear end with the platform B, extending at right angles with the main frame. At the forward end of the main frame A is a vertical post C, and to the post is secured the bearing D that serves to hold vertically and rotatively the stem E of the guide wheel fork e. At the top of the stem E and above the main frame A is the steering wheel a, and from the steering wheel the cable F is led to the drum f on shaft G. The shaft G is vertical and is provided at the top with the hand-wheel g, and by turning the hand-wheel, the guide wheel H is moved correspondingly and the carriage may be guided. It will be noted that the operator's seat J is situated at one side of the main frame, and the hand wheel g is adjacent to it and within easy reach. It will also be observed that the motor K is arranged within reach of the seat J, both being borne by the platform B. Thus, the operator is enabled to conveniently attend to the steering gear and to the motor, yet need not leave his seat to do so.

Near the rear end of the main frame A are located the bearings L for the driving wheel M. In practice it is advantageous to provide the periphery of the drive wheel M with the V-shaped blades m, as blades of that arrangement are found to most effectively catch the earth and exert the greatest driving force. Attached to the drive wheel M is the main gear N, which is driven by the pinion n on the engine shaft k. It may be stated here that the motor K may in practice be a reversible motor, and a clutch O is provided, dividing the engine shaft into two portions, and enabling the motor to be released and to stand idle when the carriage is moved by hand as explained below. I do not confine myself to any special type of motor, as any chosen engine may be used. It is, however, convenient and less troublesome to employ an engine of the internal explosion kind using gasolene, as there are many such in the market at present.

It is occasionally necessary and desirable that this invention should be moved about more or less, for example, in the farm implement storehouse or other room where it may be kept, or even in the farm yard. To enable such movement to be readily carried out there are provided the gears P and p engaging the pinion n and suitably supported by the suitable bearing Q. Engaging the gear P is a pinion R that is turned by the handcrank r. When the carriage is moved by the handcrank, the motor is, of course, released by disengaging the clutch O.

Further considering the drawings, the plowshare S has a vertical standard s movable up and down in a guide-block T attached to the main frame A. Upon one side of the standard s is a toothed rack t, and a pinion U carried in the bearings V, and operated by the gear wheel u, on the same shaft, turned by the pinion w and handcrank W. The plowbeam X is connected with the front post C of the main frame by means of the clevis Y. It will be noted in the drawings that the guide block T mentioned as occupied by the standard of the plow, may be moved along the frame A toward or from the driving wheel M, and that the pinion U, the bearings V, and the handcrank W move with the guide-block T. The reason for that construction is the occasional necessity of employing tandem plows each turning the earth a certain depth, and oftentimes provided with sod-cutters, all upon the same plowbeam, which is somewhat longer than ordinary in consequence.

In the operation of this invention, the motor being started and the clutch O engaged, the whole moves onward by reasons of the grip of the blades of the driving wheel in the earth. In practice the driving wheel runs in the furrow, and, the platform B is arranged to be level when about six inches of the driving wheel is sunk in the furrow. In other words, when this invention rests upon even ground, that side or end of the platform nearest the driving wheel is about six inches higher than the outer end at which the supporting wheel Z is located. In operation, the guiding wheel H and the platform-supporting wheel Z move evenly upon unplowed ground and the vibration of the whole structure is materially reduced. The plowshare may be raised or lowered by means of handcrank W, and in order to insure the turning of the platform with the main frame and without vibration or undue strain, a removable rod 3 is attached to the vertical front post C, and to the free end 4 of the platform, carried by wheel Z. When this invention is housed the rod 3 is removed in order that room may be afforded to place some other machine or implements near the main frame A of this invention. Attention is also called to the fact that by placing the motor to the side of the main frame, and in locating the operator's seat near it, the motor is not subjected to shocks during the plowing movement, and the comfort of the operator is also enhanced.

It will be noted that the gear P and the pinion p, the bearing Q, and the pinion R with its handcrank r, are all borne by the plate 5, and that the plate by means of the handscrew 6 may be moved between suitable guide bars 7 either toward or from pinion n on engine shaft k. The purpose of that arrangement is to free the hand-operated devices from engagement with pinion n, when the motor is used. When the guide-block T and its stated attachments are moved along the frame A to a desired position, it is secured by bolts b passed through the holes d shown in Fig. 3.

Having now described this invention, and explained its mode of operation, what I claim is:—

1. In a motor plow, the combination with a frame, of steering devices located at one end of the frame, propelling-means located near the other end of the frame, a plow arranged between the steering devices and propelling means and connected with the frame, plow lift mechanism supported by said frame and movable thereon, and means constructed to secure said mechanism at different places upon the frame in order to allow for plow beams of different lengths.

2. In a motor plow, the combination with a main frame, of a guiding wheel arranged at the front of the main frame, a driving wheel supported by the main frame, a plow connected with the main frame adjacent to the driving wheel, the said plow having a vertical standard, means movable lengthwise on the main frame and constructed to move the said standard up and down and to guide the same, a platform arranged at right angles with the main frame, a motor arranged upon the platform at one side of the driving wheel, means constructed to connect the motor and the driving wheel, a wheel arranged to support the outer end of the platform, and means located near the motor on said platform and constructed to operate the guide wheel.

3. In a motor plow, the combination with a main frame, of a guiding wheel arranged at the front of the main frame, a driving wheel supported by the main frame, a plow connected with the main frame and arranged in advance of the driving wheel, the said plow having a vertical standard, means movable lengthwise on the main frame and constructed to move the said standard up and down and to guide the same, a platform arranged at right angles with the main frame, a motor arranged upon the platform at one side of the driving wheel, means constructed to connect the motor and the driving wheel, a wheel arranged to support the outer end of the platform, and means located near the motor on said platform and constructed to operate the guide wheel.

In testimony whereof I affix my signature in presence of two witnesses.

NEWTON F. CHAMBERLIN.

Witnesses:
EDWIN GUTHRIE,
W. THEO. BENSEN.